(12) United States Patent
Osaka

(10) Patent No.: US 7,146,100 B2
(45) Date of Patent: Dec. 5, 2006

(54) REPEATER AND RAMAN AMPLIFICATION REPEATING SYSTEM

(75) Inventor: Takeo Osaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 10/740,539

(22) Filed: Dec. 22, 2003

(65) Prior Publication Data

US 2005/0179989 A1   Aug. 18, 2005

(30) Foreign Application Priority Data

Jan. 21, 2003   (JP) ............................. 2003-012294

(51) Int. Cl.
*H04B 10/00* (2006.01)
*H04B 10/08* (2006.01)

(52) U.S. Cl. ........................ 398/30; 398/181
(58) Field of Classification Search ................. 398/30, 398/181
See application file for complete search history.

(56) References Cited

U.S. PATENT DOCUMENTS

| 6,922,532 B1* | 7/2005 | Simard et al. ............... 398/177 |
| 6,930,823 B1* | 8/2005 | Nakamoto et al. .......... 359/334 |
| 6,980,745 B1* | 12/2005 | Deguchi et al. ............ 398/177 |
| 2002/0048062 A1* | 4/2002 | Sakamoto et al. .......... 359/124 |
| 2002/0067522 A1 | 6/2002 | Tanaka et al. ............... 359/110 |
| 2003/0011855 A1 | 1/2003 | Fujiwara ..................... 359/177 |
| 2003/0072062 A1* | 4/2003 | Pedersen et al. ............ 359/174 |
| 2003/0081295 A1* | 5/2003 | Kamura ....................... 359/174 |
| 2004/0208519 A1* | 10/2004 | Feldman et al. ............. 398/30 |
| 2005/0078351 A1* | 4/2005 | Avallone et al. ............ 359/334 |

FOREIGN PATENT DOCUMENTS

| EP | 1122898 A1 | 8/2001 |
| EP | 1122898 A1 * | 8/2001 |
| EP | 1122898 A8 | 10/2001 |
| JP | 1-217424 | 8/1989 |
| JP | 2000-98433 | 4/2000 |
| JP | 2003-32192 | 1/2003 |

OTHER PUBLICATIONS

S. Namiki, "Raman Amplification", The Institute of Electronics, Information and Communication Engineers Journal, vol. 83, No. 10, pp. 788-789, Oct. 2000.
European Search Report mailed Jul. 26, 2006 for corresponding European Patent Application No. 03029879.8.

* cited by examiner

*Primary Examiner*—Deandra M. Hughes
(74) *Attorney, Agent, or Firm*—Staas & Halsey LLP

(57) ABSTRACT

A Raman amplifier repeater comprising a Raman excitation light production/answer signal superimposition unit for producing a first reply signal for a down-direction line with respect to a monitor control command, an answer signal production unit for producing a second reply signal with respect to the monitor control command, and a command reply switch for selectively using the first reply signal when an optical signal passing through a down-direction line on a second terminal station side is inputted as an answer signal with respect to the monitor control command and the second reply signal when the optical signal is not inputted through the second terminal station side down-direction line. With this configuration, high-quality monitor control is feasible even if a disconnection/break trouble occurs in an optical fiber in conducting the optical amplification repeating by the Raman amplification.

14 Claims, 9 Drawing Sheets

REPEATER AND RAMAN AMPLIFICATION REPEATING SYSTEM

BACKGROUND OF THE INVENTION

1) Field of the Invention

The present invention relates to a repeater and a Raman amplification repeating system.

2) Description of the Related Art

The needs of international communications have been on the expansion at a rapid rate in conjunction with the globalization of business, the spread of the internet, and the like. In this situation, the submarine optical transmission system occupies an important position along with satellite communications and there is a pressing need to accomplish the early realization of an economical large-capacity system.

In such a submarine optical transmission system, an optical fiber cable is laid on the sea bottom and a repeater(s) is provided in the middle of the optical fiber cable to make optical transmission through optical amplification. Moreover, the submarine optical transmission system requires the highest reliability, for that a trouble of its in-the-sea portion requires a large amount of cost and takes time for repair. Therefore, there is a need for the system to have a trouble detection function to, when a trouble occurs by some change or other, detect the trouble site precisely.

For the trouble detection control, a terminal station on land first transmits a monitor/control command signal to each of repeaters for monitoring and controlling an operating state of each of the repeaters and, when receiving the monitor/control command signal therefrom, the repeater monitors its own operating state and transmits answer information indicative of a monitor result to the terminal station. In this way, a state of submarine optical transmission is monitored through communications between the terminal station and the repeaters.

Meanwhile, a conventional repeater employs EDFA (Erbium-Doped Fiber Amplifier) for optical amplification. that is, this EDFA type repeater is designed to superimpose an answer signal on a main optical signal and, in this case, the output of an excitation laser diode, which excites the EDFA, is modulated with the answer information to modulate the main optical signal for the superimposition of the answer signal on the main optical signal.

In addition, even if a disconnection/break trouble occurs in an optical fiber cable so that the optical main signal itself disappears, the EDFA repeater can transmit an answer signal by modulating an ASE (Amplified Spontaneous Emission) light from the EDFA itself serving as an amplification medium, thereby avoiding the incapability of the monitor control.

On the other hand, in the recent optical communication systems, attention is paid to an optical fiber amplifier utilizing a non-linear optical phenomenon in an optical fiber, so-called Raman amplification. The optical fiber amplifier achieves the optical amplification by making an intensive exciting light incident on the entire optical fiber transmission line, utilizing a physical phenomenon in which light different in wavelength from incident light scatters (Raman Scattering) due to a vibration phenomenon in a substance.

When such a Raman amplification method is used for a repeater to accomplish the optical amplification, larger-capacity transmission becomes feasible, in comparison with a conventional method. The Raman amplification repeater employing this Raman amplification transmits a response signal indicative of an operating state of the Raman amplification repeater according to a monitor/control command.

As in the case of the EDFA repeater, the Raman amplification repeater modulates the output of an excitation laser diode, which is for exciting an optical fiber acting as an amplification medium, with answer information. It follows that the Raman amplification repeater modulates the optical main signal with the answer information, and thereby transmits an answer signal to the terminal station side.

Incidentally, although the technique on the Raman amplification repeat is disclosed in two documents: Japanese Laid-Open No. HEI 01-217424 and No. 2000-98433, these documents does not touch the technique of monitoring a state of optical transmission on the sea bottom through communications between a terminal station and a repeater (s).

However, in the case of the above-mentioned Raman amplification repeating, if a disconnection/break trouble occurs in an optical fiber cable in the vicinity of the Raman amplifier repeater, the amplification medium disappears and, hence, no emission of the ASE light occurs. Accordingly, difficulty is experienced in transmitting an answer signal to a terminal station, which affects the monitor control.

Moreover, in a case in which an SV signal serving as a monitor control signal is repeated together with the repeating of an optical signal in making the repeating transmission in the Raman amplification repeater, there is a need to provide a technique of transmitting the SV signal even if an optical signal acting as a main signal is not transmitted due to the fiber disconnection or the like in the former repeating zone.

SUMMARY OF THE INVENTION

The present invention has been developed in consideration of these situations, and it is therefore an object of the invention to provide a repeater and a Raman amplification repeating system, capable of achieving high-quality monitor control even if a disconnection/break trouble occurs in an optical fiber cable when the optical amplification repeating is conducted through the use of the Raman amplification.

For this purpose, in accordance with an aspect of the present invention, there is provided a repeater designed to conduct Raman amplification on an optical signal propagating in a transmission line, comprising a Raman excitation light production/answer signal superimposition unit for modulating an answer signal to a monitor control command included in an optical signal from a first terminal station through an up-direction line into a Raman excitation light for the Raman amplification and for supplying the modulated Raman excitation light to a down-direction transmission line fiber on a second terminal station side to produce a first reply signal for a down-direction line by superimposing the answer signal on an optical signal passing through the down-direction line on the second terminal station side, and an answer signal production unit for producing a second reply signal to the monitor control command in a case in which an optical signal is not inputted through the second terminal station side down-direction line.

In addition, in accordance with another aspect of the present invention, there is provided a repeater designed to conduct Raman amplification on an optical signal propagating in a transmission line, comprising first means for modulating an excitation light for amplification of the optical signal with a signal to superimpose the signal on the optical signal and supply them to the transmission line, and second means for generating a light on which the signal is superimposed to supply it to the transmission line.

Still additionally, in accordance with a further aspect of the present invention, there is provided a Raman amplification repeating system designed such that first and second terminal stations are connected through a transmission line fiber and an optical signal propagating in the transmission line fiber is Raman-amplified through the use of one or plural Raman amplifier repeaters for repeating, each of the first and second terminal stations comprising a monitor control command transmission unit for transmitting a monitor control command, addressed to one of the one or plural Raman amplification repeaters, together with identification information on the Raman amplification repeater and a monitor control implementation unit for receiving an answer to the monitor control command from the one or plural Raman amplification repeaters to implement the monitor control, and the one or plural Raman amplifier repeaters a Raman Excitation light production/answer signal superimposition unit for modulating an answer signal to a monitor control command included in an optical signal from the monitor control command transmission unit of one of the first and second terminal stations into a Raman excitation light for the Raman amplification to supply the modulated Raman excitation light to transmission line fibers of two-way lines on the first and second terminal station sides so that the answer signal is superimposed on optical signals passing through the two-way lines to produce a first reply signal, a first terminal station addressed answer signal production unit for producing a second reply signal, addressed to the first terminal station, with respect to the monitor control command when an optical signal passing through a down-direction line on the second terminal station side is not inputted thereto, a first terminal station addressed command reply switch for making the switching to, as a first terminal station addressed answer signal passing through the first terminal station side down-direction line with respect to the monitor control command, use the first reply signal when an optical signal is inputted through the second terminal station side down-direction line and to use the second reply signal when an optical signal is not inputted through the second terminal station side down-direction line, a second terminal station addressed answer signal production unit for producing a third reply signal, addressed to the second terminal station, with respect to the monitor control command when an optical signal is not inputted through an up-direction line on the first terminal station side, and a second terminal station addressed command reply switch for selectively using, as a second terminal station addressed answer signal passing through the second terminal station side up-direction line with respect to the monitor control command, the first relay signal when an optical signal is inputted through the first terminal station side up-direction line, and the third relay signal when an optical signal is not inputted through the first terminal station side up-direction line.

With this configuration according to the present invention, in conducting the optical amplification repeating through the use of the Raman amplification, even if a disconnection/break trouble occurs in an optical fiber cable, high-quality monitor control is achievable.

DESCRIPTION OF THE PREFERRED EMBODIMENTS

Embodiments of the present invention will be described hereinbelow with reference to the drawings.

[A] Description of First Embodiment

Figure 1:
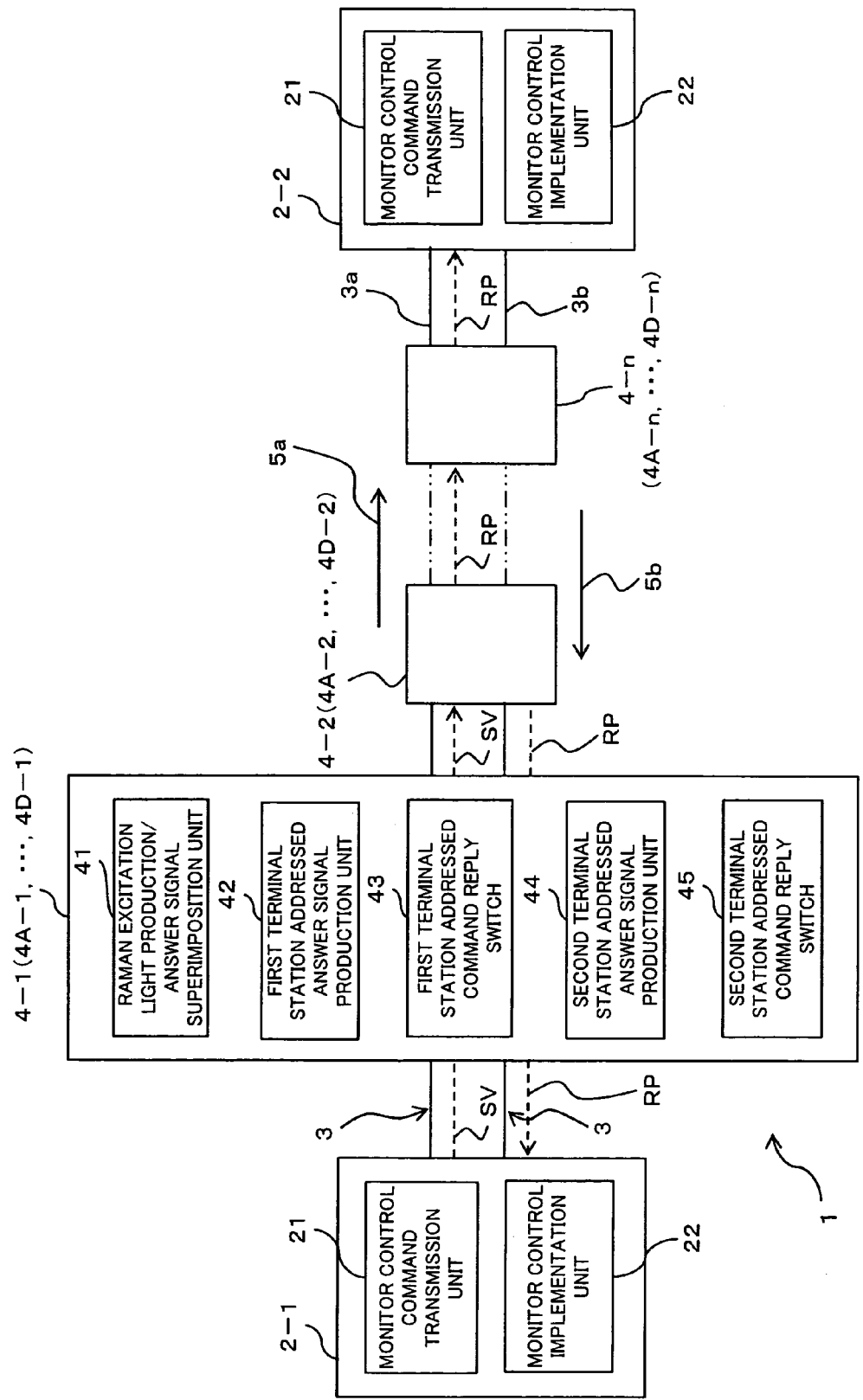
FIG. 1 is a block diagram showing a Raman amplification repeating system according to embodiments of the present invention.

FIG. 1 is a block diagram showing a Raman amplification repeating system according to a first embodiment of the present invention. In FIG. 1, in a Raman amplification repeating system generally designated at reference numeral 1, a first terminal station 2-1 and a second terminal station 2-2 are connected to each other through a transmission line fiber 3, and optical signals propagating in the transmission line fiber 3 are Raman-amplified by n (n: natural number) Raman amplification repeaters (repeaters) 4-1 to 4-n for repeating.

In a case in which the Raman amplification repeating system shown in FIG. 1 is applied to a submarine optical transmission system, the first and second terminal stations 2-1 and 2-2 are located, for example, in station houses on land while the respective Raman amplification repeaters 4-1 to 4-n are placed in the sea. Moreover, the transmission line fiber 3 is composed of an optical fiber 3a acting as an up-direction line 5a for transmitting an optical signal from the first terminal station 2-1 to the second terminal station 2-2 and an optical fiber 3b acting as a down-direction line 5b for transmitting an optical signal from the second terminal station 2-2 to the first terminal station 2-1.

Each of the first and second terminal stations 2-1 and 2-2 is made up of a monitor control command transmission unit 21 for transmitting a monitor control command, addressed to any one of the aforesaid n Raman amplification repeaters 4-1 to 4-n, together with identification information on the destination Raman amplification repeater 4-1 to 4-n, and monitor control implementation unit 22 for receiving an answer signal from the Raman amplification repeaters 4-1 to 4-n to implement the monitor control.

For example, in the monitor control command transmission unit 21, with respect to an optical signal serving as a main signal, a coded monitor control command is superimposed through, for example, amplitude modulation to be modulated, and in the Raman amplification repeaters 4-1 to 4-n which will be mentioned afterward, a monitor control command superimposed on a main signal to be modulated is derived from an inputted optical signal.

The monitor control implementation unit 22 of each of the terminals stations 2-1 and 2-2 receives an answer signal to a monitor control command from the Raman amplification repeaters 4-1 to 4-n and, after making a decision as to whether or not it is an answer from the destination Raman amplification repeater 4-1 to 4-n to the monitor control command transmitted from the terminal station 2-1, 2-2 to which this monitor control implementation unit 22 pertains, implements the monitor control on the basis of monitor information included in that answer signal.

For example, in the case shown in FIG. 1, the first terminal station 2-1 transmits a monitor control command SV addressed to the Raman amplification repeater 4-2, and the Raman amplification repeater 4-2 sends an answer signal RP to the first terminal station 2-1 and the second terminal station 2-2. Upon receipt of this answer signal RP, of the first and second terminal stations 2-1 and 2-2, the first terminal station 2-1 which has transmitted the monitor control command SV corresponding to the answer signal RP implements the monitor control on the monitor information included in the answer signal RP.

Figure 2:
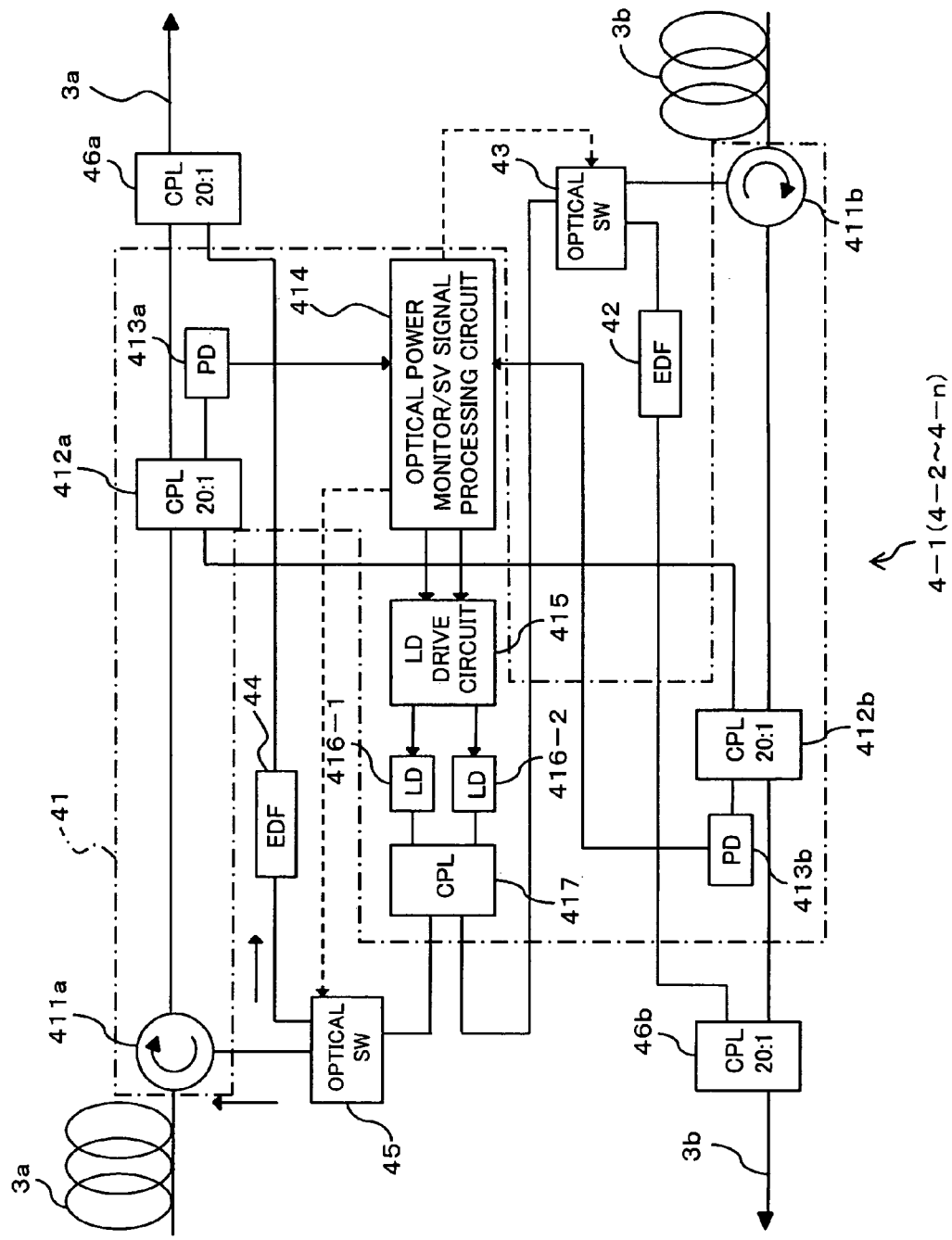
FIG. 2 is a block diagram showing a Raman amplification repeater according to a first embodiment of the present invention.

Moreover, each of the Raman amplification repeaters 4-1 to 4-n is made up of a Raman excitation light production/ answer signal superimposition unit 41, a first terminal station addressed answer signal production unit 42, a first terminal station addressed command reply switch 43, a second terminal station addressed answer signal production unit 44 and a second terminal station addressed command reply switch, and FIG. 2 shows a more detailed configuration thereof. In FIG. 1, the illustration is drawn noting the Raman amplification repeater 4-1.

A description will be given hereinbelow of the configuration of each of the Raman amplification repeaters 4-1 to 4-n. In the following description, the Raman amplification repeaters 4-1 to 4-n will sometimes be referred to simply as repeaters 4-1 to 4-n.

The Raman excitation light production/answer signal superimposition unit 41 modulates an answer signal to a monitor control command included in an optical signal from the monitor control command transmission unit 21 of the first terminal station 2-1 or the second terminal station 2-2 into a Raman excitation light for the Raman amplification and supplies the modulated Raman excitation light to transmission line fibers 3b and 3a of two-way lines 5b and 5a on the first terminal station 2-1 side and on the second terminal station 2-2 side, thereby superimposing the aforesaid answer signal on optical signals passing through the two-way lines 5b and 5a to produce a first reply signal (first signal made for a reply).

That is, noting the Raman excitation light to be supplied to the optical fiber 3b of the down-direction line 5b on the second terminal station 2-2 side, an answer signal to a monitor control command included in an optical signal passing through the up-direction line 5a from the first terminal station 2-1 is modulated into a Raman excitation light for the Raman amplification, and the modulated Raman excitation light is supplied to the transmission line fiber 3b of the down-direction line 5b on the second terminal station 2-2 side so that the answer signal is superimposed on an optical signal passing through the down-direction line 5b on the second terminal station 2-2 side, thus producing a first reply signal.

As shown in FIG. 2, the Raman excitation light production/answer signal superimposition unit 41 is composed of optical circulators 441a and 411b, couplers (CPLs) 412a and 412b, photodiodes (PDs) 413a and 413b, an optical power monitor/SV signal processing circuit 414, an LD drive circuit 415, laser diodes (LDs) 416-1 and 416-2 functioning as excitation light sources emitting Raman excitation lights, and a coupler 417.

The optical circulator 411a outputs an optical signal from the first terminal station 2-1 side optical fiber 3a to the latter-stage (rearward) coupler 412a while sending to the first terminal station 2-1 side optical fiber 3a an excitation light for the Raman excitation from an optical switch 45 serving as a second terminal station addressed command reply switch which will be mentioned latter.

Likewise, the optical circulator 411b outputs an optical signal from the second terminal station 2-2 side optical fiber 3b to the coupler 412b while forwarding to the second terminal station 2-2 side optical fiber an excitation light for the Raman excitation from an optical switch functioning as a first terminal station addressed command reply switch which will be mentioned later.

Moreover, each of the couplers 412a and 412b branches an optical signal from the optical circulator 411a or 411b, for example, at a branch ratio of approximately 20:1, and outputs an optical signal corresponding to approximately 1/20 of the branched optical signal to the photodiode 413a or 413b and outputs the remaining optical signal to couplers 46a or 46b which will be described later.

Each of the photodiodes 413a and 413b converts a branched portion of the optical signal from the couplers 412a or 412b into an electric signal and outputs it to the optical power monitor/SV signal processing circuit 414.

Figure 3:
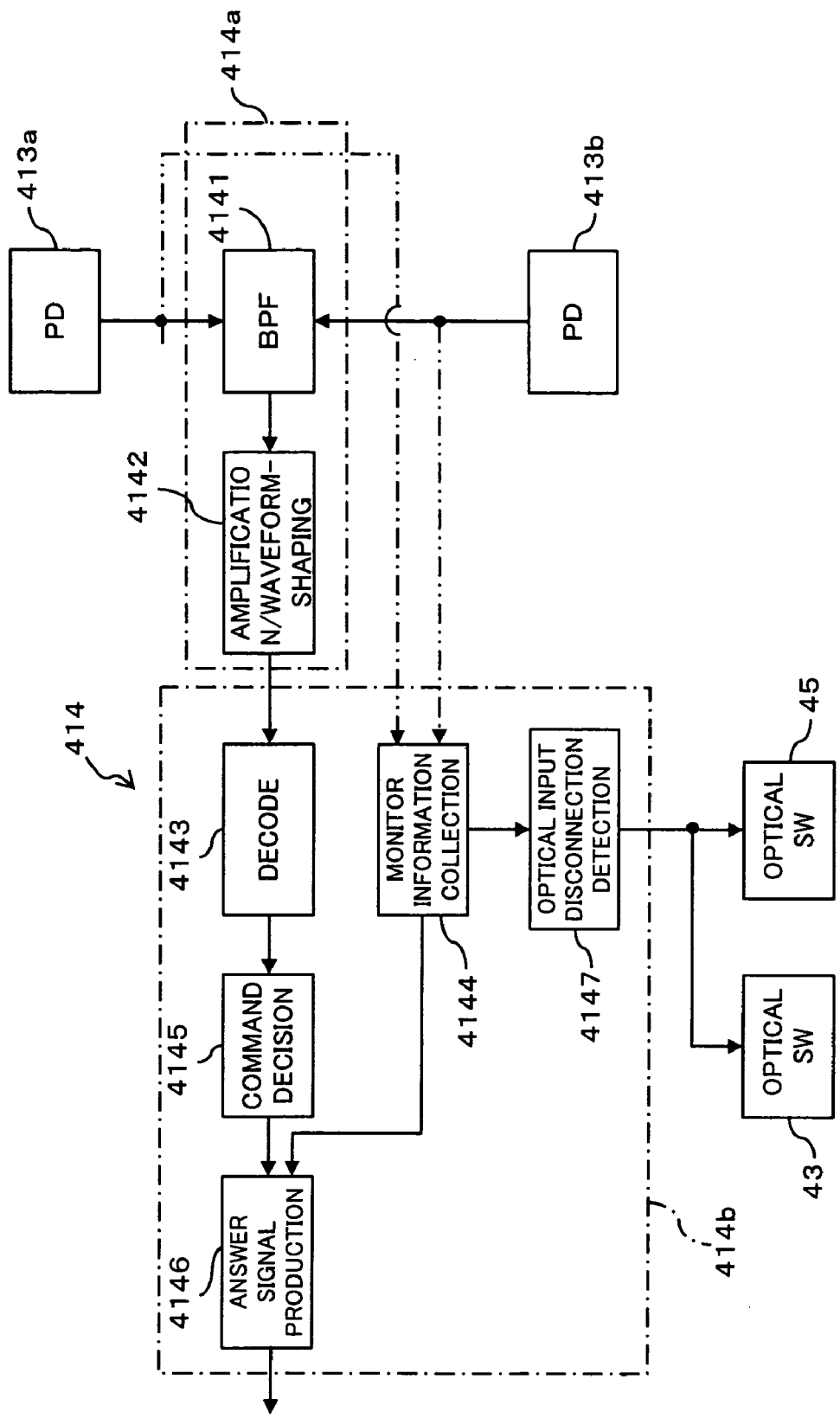
FIG. 3 is a block diagram showing an essential part of the Raman amplification repeater according to the first embodiment of the present invention.

The optical power monitor/SV signal processing circuit 414 extracts a monitor control command from an electric signal from each of the photodiodes 413a and 413b to conduct necessary signal processing according to this monitor control command. As shown in FIG. 3, the optical power monitor/SV signal processing circuit 414 is composed of a command extraction circuit 414a for extracting a signal component forming a monitor control command and a command processing unit 414b for processing the monitor control command forming the extracted signal component.

In this configuration, the command extraction circuit 414a includes a band pass filter 4141 for extracting a frequency component into which the monitor control command is modulated and an amplification/waveform-shaping processing circuit 4142 for amplifying and waveform-shaping the extracted signal component.

Concretely, the bandpass filter 4141 extracts a burst signal serving as a monitor command signal and the amplification/waveform-shaping processing circuit 4142 detects the envelope of this burst signal to obtain a coded signal of, for example, approximately several kHz to several tens kHz.

The command processing unit 414b is composed of a decoder 4143, a monitor information collector 4144, a command decision unit 4145, an answer signal production unit 4146 and an optical input disconnection detector 4147.

The decoder 4143 is for decoding a coded signal from the amplification/waveform-shaping processing circuit 4142.

The monitor information collector 4144 is for collecting monitor information included in, for example, an answer signal to a monitor control command. For example, the monitor information collector 4144 collects, as the monitor information, a monitor value of optical input power inputted from the optical fiber 3a, 3b to the repeater 4-1 to 4-n it pertains to, a monitor value of optical output power outputted to the optical fiber 3a, 3b, a value of current flowing the laser diode 416-1, 416-2 which emits an excitation light for the Raman excitation, and the like.

The command decision unit 4145 is for making a decision, on the basis of destination information included in the monitor control command decoded in the decoder 4143, as to whether or not the command is addressed to the repeater 4-1 to 4-n it pertains to. The answer signal production unit 4146 produces an answer signal through the use of the monitor information collected in the monitor information collector 4144 and the identification information on the repeater 4-1 to 4-n, it pertains to, when the decision result in the command decision unit 4145 shows that the signal decoded in the decoder 4143 is the monitor control command addressed to the repeater 4-1 to 4-n it pertains to.

Moreover, the optical input disconnection detector 4147 is for making a decision, on the basis of a signal indicative of an optical input level from the monitor information collector 4144, as to whether or not an optical signal is inputted from the optical fiber 3a, 3b and for notifying the decision result to the optical switch 43, 45. In particular, the optical input disconnection detector 4147 detects a non-inputted state of an optical signal through the optical fiber 3a, 3b and a disconnection/break trouble on the optical fiber 3a, 3b at a position relatively close to the repeater 4-1 to 4-n it pertains to and notifies the detection result to the optical switch 43, 45.

Still moreover, the LD drive circuit 415 organizing the Raman excitation light production/answer signal superimposition unit 41 is for superimposing the answer signal produced in the answer signal production unit 4146 on a voltage signal for driving the laser diode 416-1, 416-2 functioning as a Raman excitation light source.

Thus, each of the laser diodes 416-1 and 416-2 can produce a Raman excitation light in which the answer signal is modulated. Incidentally, it is possible that both the laser diodes 416-1 and 416-2 are used as work systems, or that one is used as a work system while the other is used as a protection system. Moreover, the coupler 417 multiplexes/demultiplexes the Raman excitation lights from the laser diodes 416-1 and 416-2 and outputs them to the first terminal station addressed command replay switch 43 and the second terminal station addressed command reply switch 45.

The optical switch (optical SW) 43 serving as a (first terminal station addressed) command reply switch is made to selectively output the Raman excitation light from the coupler 417 to the optical circulator 411b or the Erbium-doped fiber 42 on the basis of a signal from the optical input disconnection detector 4147 of the optical power monitor/SV signal processing unit 414 in accordance with whether or not an optical signal is inputted through the second terminal station 2-2 side down-direction line 5b.

The Erbium-doped fiber 42 serving as the (first terminal station addressed) answer signal production unit is made to produce an ASE light acting as a second reply signal (second signal made for a reply) addressed to the first terminal station 2-1 with respect to a monitor control command when an optical signal is not inputted through second terminal station 2-2 side down-direction line 5b. Concretely, in the case of no input of an optical signal through the second terminal station 2-2 side down-direction line 5b, a (answer signal modulated) light from the coupler 417 is inputted through the optical switch 43 and an answer signal modulated ASE light is outputted therefrom.

That is, in the optical switch 43, a first relay signal is produced in a manner such that the Raman excitation light is outputted to the second terminal station 2-2 side optical fiber 3b, while a second relay signal is produced in a manner such that the Raman excitation light is outputted to the EDF 42.

In other words, through the use of the optical switch 43, the aforesaid first reply signal is selectively used in a case in which an optical signal is inputted through the second terminal station 2-2 side down-direction line 5b as a first terminal station addressed answer signal passing through the first terminal station 2-1 side down-direction line 5b with respect to a monitor control command, and the aforesaid second relay signal from the EDF 42 is selectively used when an optical signal is not inputted through the second terminal station 2-2 side down-direction line 5b.

The coupler 46b is for, when the optical switch 43 selects the second reply signal, propagating the natural emission light outputted from the EDF 42 in the optical fiber 3b of the first terminal station 2-1 side down-direction line 5b, with the ASE light serving as the second reply signal being sent through this down-direction line 5b to the first terminal station 2-1.

On the other hand, the optical switch (optical SW) 45 functioning as a (second terminal station addressed) command reply switch selectively outputs the Raman excitation light from the coupler 417 to the optical circulator 411b or the Erbium-doped fiber 42 on the basis of a signal from the optical input disconnection detector 4147 of the optical power monitor/SV signal processing unit 414 in accordance with whether or not an optical signal is inputted through the first terminal station 2-1 side up-direction line 5a.

The Erbium-doped fiber (EDF) 44 serving as the (second terminal station addressed) answer signal production unit is made to produce an ASE light acting as a second reply signal addressed to the second terminal station 2-2 with respect to a monitor control command when an optical signal is not inputted through the first terminal station 2-1 side up-direction line 5a. Concretely, in the case of no input of an optical signal through the first terminal station 2-1 side up-direction line 5a, a (answer signal modulated) light from the coupler 417 is inputted through the optical switch 45 as an excitation light and an answer signal modulated ASE light is outputted therefrom.

That is, in the optical switch 45, a first relay signal is produced in a manner such that the Raman excitation light is outputted to the first terminal station 2-1 side optical fiber 3b, while a second relay signal is produced in a manner such that the Raman excitation light is outputted to the EDF 44.

In other words, through the use of the optical switch 45, the aforesaid first reply signal is selectively used in a case in which an optical signal is inputted through the first terminal station 2-1 side up-direction line 5a as a second terminal station addressed answer signal passing through the second terminal station 2-2 side up-direction line 5a with respect to a monitor control command, and the aforesaid second relay signal from the EDF 44 is selectively used when an optical signal is not inputted through the first terminal station 2-1 side up-direction line 5a.

The coupler 46a is for, when the optical switch 45 selects the second reply signal, propagating the natural emission light outputted from the EDF 44 in the optical fiber 3a of the second terminal station 2-2 side up-direction line 5a, with the ASE light serving as the first reply signal being sent through this up-direction line 5a to the second terminal station 2-2.

In the Raman amplification repeating system 1 according to the first embodiment of the present invention which has the above-described configuration, the optical signals interchanged between the first terminal station 2-1 and the second terminal station 2-2 are Raman-amplified in the Raman amplification repeaters 4-1 to 4-n located on the transmission line fiber 3.

At this time, in the first terminal station 2-1 and the second terminal station 2-2, the states of the Raman amplification repeaters 4-1 to 4-n are monitored through the interchange of the monitor control information with respect to the Raman amplification repeaters 4-1 to 4-n to, when a trouble occurs, specify the trouble occurrence site quickly.

That is, in each of the Raman amplification repeaters 4-1 to 4-n, in a case in which an optical signal to be repeated is inputted through the up-direction and down-direction lines 5a and 5b with respect to a monitor control command from the first terminal station 2-1 or the second terminal station 2-2, through the switching by the optical switches 43 and 45, the reply is made through the use of a first reply signal obtained by superimposing an answer signal on the Raman-amplified main signal.

In addition, in a case in which an optical signal to be repeated through each of the up-direction and down-direction lines 5a and 5b is not inputted because a break/disconnection trouble or the like occurs in an optical fiber in the vicinity of each of the Raman amplification repeaters 4-1 to 4-n, the reply is made through the use of a second reply signal, i.e., (answer signal modulated) ASE light, from the EDF 42, 44 with respect to a monitor control command from the first terminal station 2-1 or the second terminal station 2-2.

Figure 4:
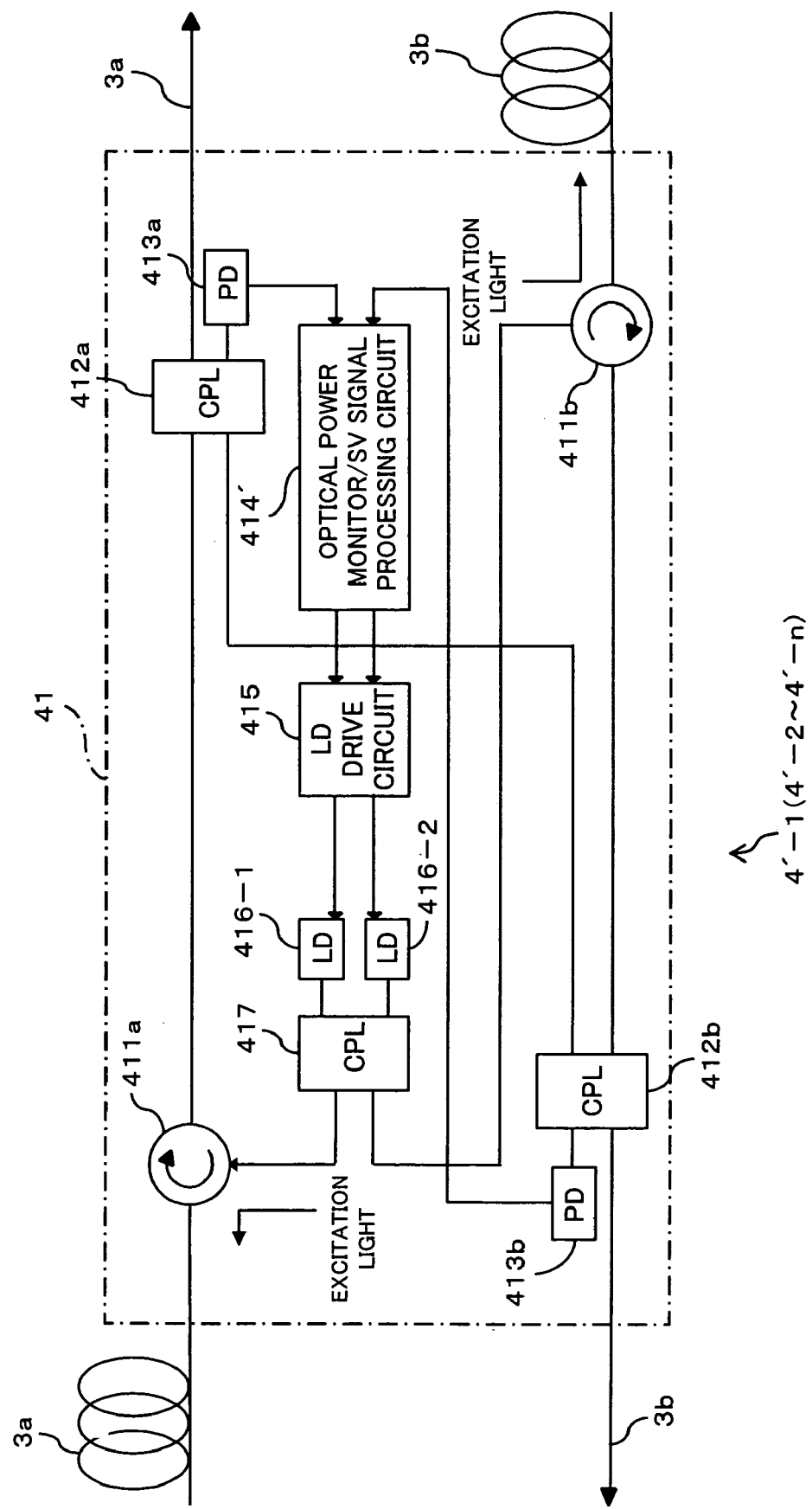
FIG. 4 is an illustration of a Raman amplification repeater taken for explaining the effects of the Raman amplification repeater according to the first embodiment of the present invention.

Thus, according to the first embodiment of the present invention, as compared with Raman amplification repeaters 4'-1 to 4'-n, shown in FIG. 4, each of which is not equipped with the Erbium-doped fibers 42 and 44 functioning as an answer signal production unit and the optical switches 43 and 45 functioning as a command reply switch, even if a break/disconnection trouble occurs in an optical fiber cable when the optical amplification repeating is made through the use of the Raman amplification, the high-quality monitor control is feasible, and the Erbium-doped fibers 42 and 44 do not require a high-accuracy characteristic, which contributes to the cost reduction of the system construction.

Incidentally, in the Raman amplification repeaters 4'-1 to 4'-n shown in FIG. 4, the Raman light production/answer signal superimposition unit 41' is equipped with an optical power monitor/SV signal processing circuit 414' different from that (see reference numeral 41) of the first embodiment of the present invention. That is, the Raman light production/answer signal superimposition unit 41' has functions (see reference numerals 4141 to 4146) except the optical input disconnection detector 4147. Moreover, in FIG. 4, the same reference numerals as those in FIG. 2 designate the corresponding parts.

[B] Description of Second Embodiment

Figure 5:
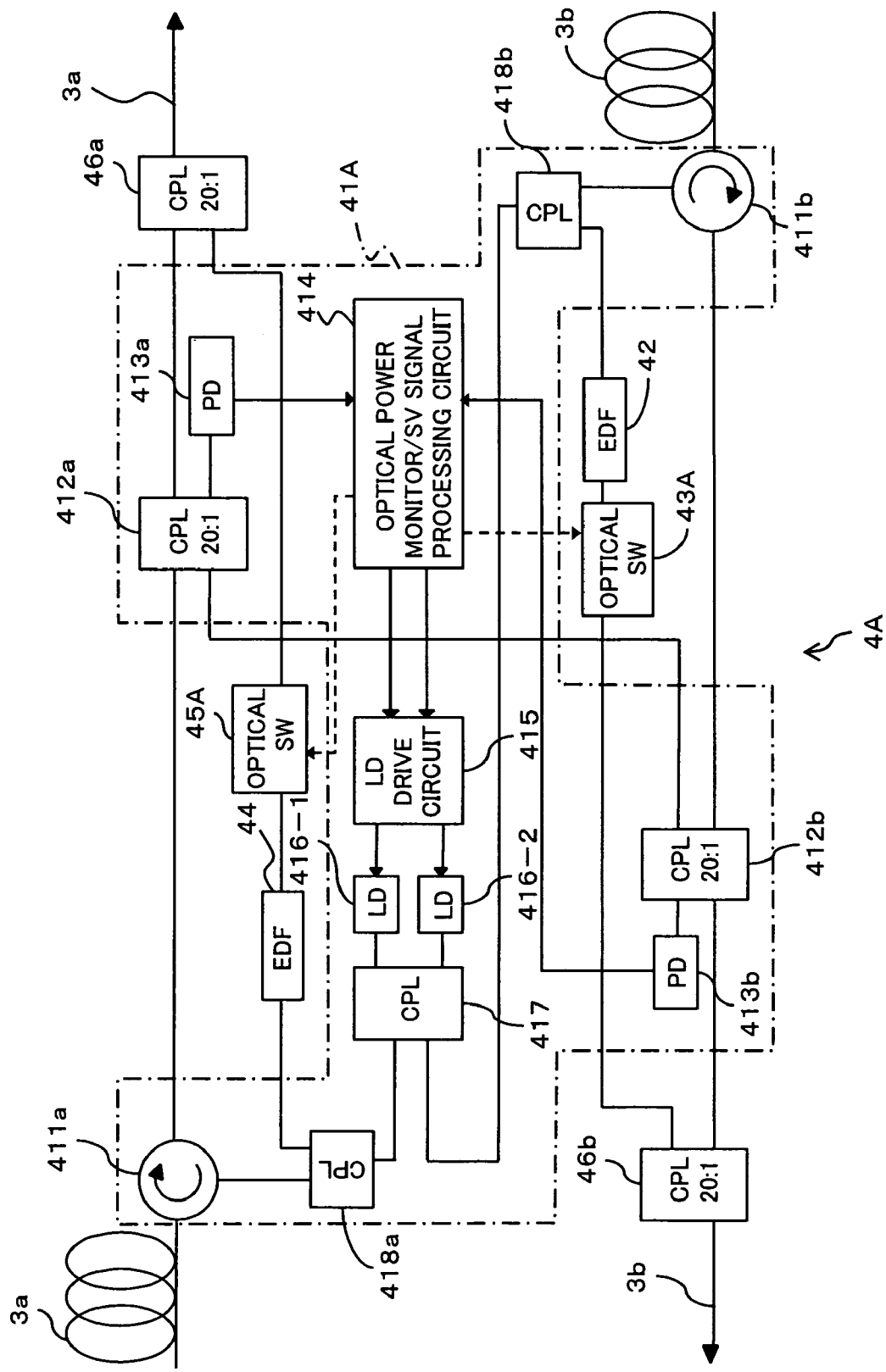
FIG. 5 is a block diagram showing a Raman amplification repeater according to a second embodiment of the present invention.

FIG. 5 is a block diagram showing a Raman amplification repeater 4A according to a second embodiment of the present invention. The Raman amplification repeater 4A shown in FIG. 5 is also applicable to each of the Raman amplification repeaters 4-1 to 4-n of the above-described Raman amplification repeating system 1 according to the first embodiment, but it differs from the Raman amplification repeaters 4-1 to 4-n according to the first embodiment in the configuration of the Raman excitation light production/answer signal superimposition unit (41A) and the optical switches (43A and 45A). In FIG. 5, the same reference numerals as those of FIG. 2 designate the corresponding parts.

In the Raman amplification repeater 4A shown in FIG. 5, the Raman excitation light production/answer signal superimposition unit 41A is made such that, as compared with the above-mentioned unit (see reference numeral 41) in FIG. 2, couplers 418a and 418b are provided instead of the optical switches 45 and 43.

The coupler 418a demultiplexes (branches) one Raman excitation light from the coupler 417, with one demultiplexed light being outputted to the optical circulator 411a and the other being outputted to the EDF 44. Moreover, the coupler 418b demultiplexes the other Raman excitation light from the coupler 417, with one demultiplexed light being outputted to the optical circulator 411b and the other being outputted to EDF 42.

In other words, the Raman excitation light production/answer signal superimposition unit 41A is designed such that the down-direction line Raman excitation light is supplied not only to the optical fiber 3b of the second terminal station 2-2 side down-direction line 5b but also to the EDF 42 serving as an answer signal production unit. Likewise, the Raman excitation light production/answer signal superimposition unit 41A is designed such that the up-direction line Raman excitation light is supplied not only to the optical fiber 3a of the first terminal station 2-1 side up-direction line 5a but also to the EDF 44.

In addition, upon receipt of the down-direction line Raman excitation light from the Raman excitation light production/answer signal superimposition unit 41A, the EDF 42 serving as an answer signal production unit outputs an (answer signal modulated) ASE light as a second reply signal. Likewise, upon receipt of the up-direction line Raman excitation light from the Raman excitation light production/answer signal superimposition unit 41A, the EDF 44 outputs an (answer signal modulated) ASE light as a second reply signal.

Still additionally, upon receipt of optical input disconnection detection information from the optical power monitor/SV signal processing circuit 414, the optical switch 43A outputs the ASE light from the EDF 42 to the latter-stage coupler 46b in accordance with whether or not an optical signal is inputted through the second terminal station 2-2 side down-direction line 5b. Likewise, upon receipt of optical input disconnection detection information from the optical power monitor/SV signal processing circuit 414, the optical switch 43A outputs the ASE light from the EDF 44 to the latter-stage coupler 46a in accordance with whether or not an optical signal is inputted through the first terminal station 2-1 side up-direction line 5a.

Concretely, the optical switch 43A functioning as the command reply switch terminates the ASE light from the EDF 42 when inputted is an optical signal passing through the second terminal station 2-2 side down-direction line 5b, and supplies the ASE light from the EDF 42 through the first terminal station 2-1 side down-direction line 5b to the first terminal station 2-1 in the case of no input of the optical signal through the second terminal station 2-2 side down-direction line 5b.

Moreover, the optical switch 45A terminates the ASE light from the EDF 44 when inputted is an optical signal passing through the first terminal station 2-1 side up-direction line 5a, and supplies the ASE light from the EDF 44 through the second terminal station 2-2 side up-direction line 5a to the second terminal station 2-2 in the case of no input of the optical signal through the first terminal station 2-1 side up-direction line 5a.

That is, in a case in which the excitation light power sufficient for the Raman amplification in each of the optical fibers 3a and 3b is attainable even if the excitation light from the coupler 417 is branched by the couplers 418a and 418b, it is also appropriate that, like this embodiment, the couplers 418a and 418b are provided at the positions of the optical switches 45 and 43 in the first embodiment. In this case, if an optical input disconnection state occurs, the optical switches 43A and 45A can terminate the ASE lights from the EDFs 42 and 44, thereby suppressing the influence of reflection which can occur in the case of no termination.

Even in a case in which the Raman amplification repeater 4A having this configuration is used as Raman amplification repeaters 4A-1 to 4A-n in place of the Raman amplification repeaters 4-1 to 4-n shown in FIG. 1, the monitor control is also executable as in the case of the above-described first embodiment. That is, the first and second terminal stations 2-1 and 2-2 can monitor the states of the Raman amplification repeaters 4A-1 to 4A-n through the interchange of monitor control information with the Raman amplification repeaters 4A-1 to 4A-n and, if a trouble occurs, can quickly specify the trouble occurrence site.

In this case, in each of the Raman amplification repeaters 4A-1 to 4A-n, when an optical signal to be repeated is inputted through each of the up-direction and down-direction lines 5a and 5b with respect to a monitor control signal from the first terminal station 2-1 or the second terminal station 2-2, by means of the switching action of the optical switches 43A and 45A, the reply is made through the use of a first reply signal obtained by superimposing an answer signal on the Ranam-amplified main signal.

Moreover, in a case in which a break/disconnection trouble or the like occurs in an optical fiber in the vicinity of each of the Raman amplification repeaters 4A-1 to 4A-n and an optical signal to be repeated is not inputted thereto through each of the up-direction and down-direction lines 5a and 5b, with respect to a monitor control command from the first terminal station 2-1 or the second terminal station 2-2, the reply is made through the use of a second reply signal acting as an (answer signal modulated) ASE light from the EDF 42, 44.

Thus, also in the second embodiment of the present invention, in a case in which a break/disconnection trouble occurs in an optical fiber cable in conducting the optical amplification repeating through the Raman amplification, the high-quality monitor control is achievable, and the Erbium-doped fibers 42 and 44 do not require a high-accuracy characteristic, which contributes to the cost reduction of the system construction.

[C] Description of Third Embodiment

Figure 6:
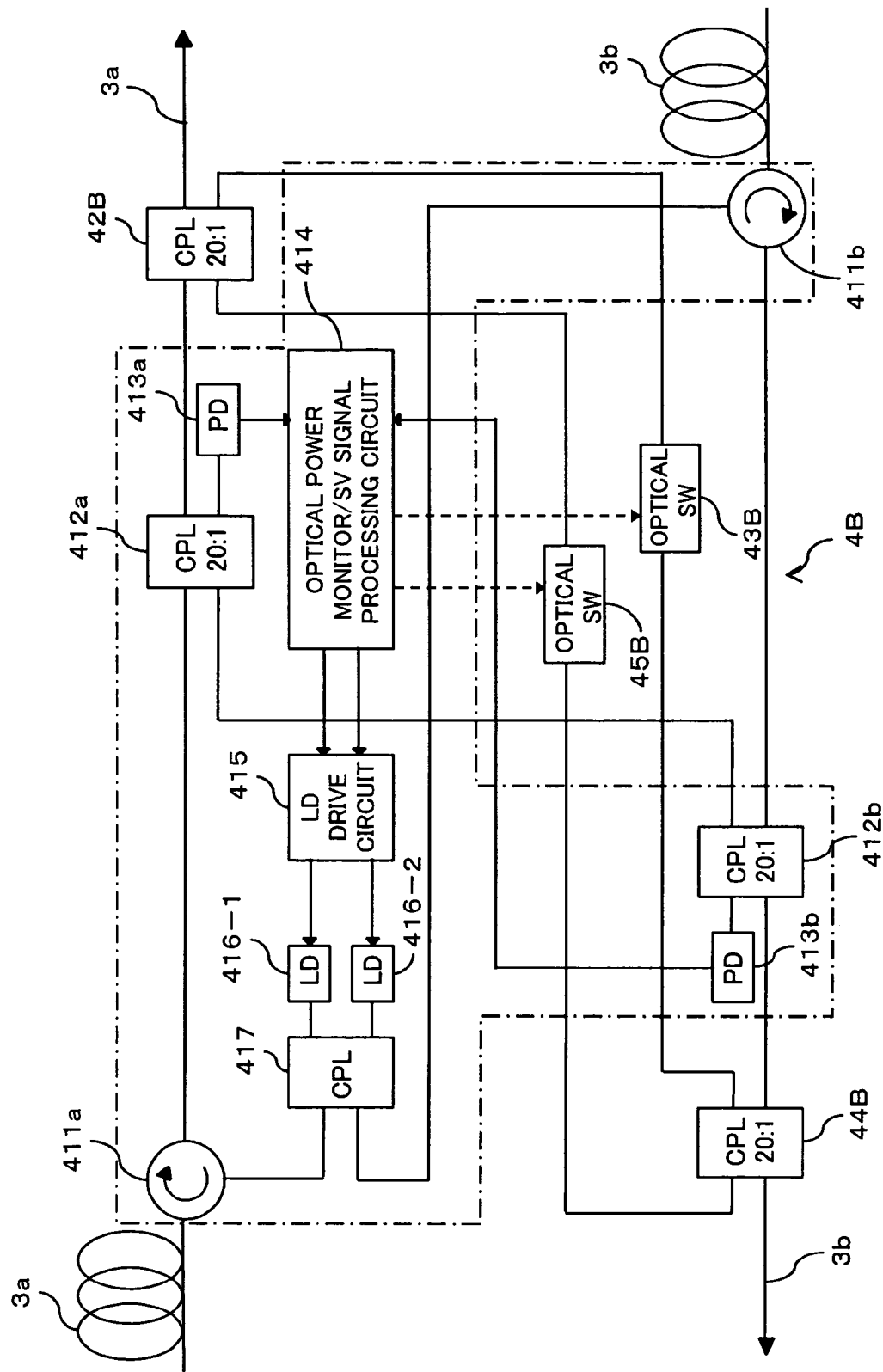
FIG. 6 is a block diagram showing a Raman amplification repeater according to a third embodiment of the present invention.

FIG. 6 is a block diagram showing a Raman amplification repeater 4B according to a third embodiment of the present invention. The Raman amplification repeater 4B shown in FIG. 6 is also applicable to each of the Raman amplification repeaters 4-1 to 4-n of the above-described Raman amplification repeating system 1 according to the first embodiment.

In the Raman amplification repeater 4B shown in FIG. 6, in comparison with the Raman amplification repeaters 4-1 to 4-n according to the first embodiment, a coupler 42B takes charge of the function of the answer signal production unit, and optical switches 43B and 45B are used which are different in function therefrom. In FIG. 6, the same reference numerals as those in FIG. 2 represent the corresponding parts.

That is, the coupler 42B functioning as the answer signal production unit receives an optical signal (first reply signal addressed to the second terminal station 2-2), amplified by a (answer signal modulated) Raman excitation light, supplied from the Raman excitation light production/answer signal superimposition unit 41 to the optical fiber 3a, and branches this first reply signal to output it as a second reply signal to the optical switch 43B serving as the first terminal addressed command reply switch. Therefore, the coupler 46a functions as an optical signal extraction coupler to extract a portion of a first reply signal from the up-direction line 5a as a second reply signal.

Moreover, the coupler 44B receives an optical signal (first reply signal addressed to the first terminal station 2-1), amplified by a (answer signal modulated) Raman excitation light, supplied from the Raman excitation light production/answer signal superimposition unit 41 to the optical fiber 3b, and branches this first reply signal to output it as a second reply signal to the optical switch 45B.

Still moreover, the optical switch 43B receives optical input disconnection detection information from the optical power monitor/SV signal processing circuit 414 to output the ASE light from the coupler 42B to the output side coupler 44B in accordance with whether or not an optical signal is inputted through the second terminal station 2-2 side down-direction line 5b. Likewise, the optical switch 45B receives the optical input disconnection detection information from the optical power monitor/SV signal processing circuit 414 to output the ASE light from the coupler 44B to the output side coupler 42B in accordance with whether or not an optical signal is inputted through the first terminal station 2-1 side down-direction line 5a.

Concretely, the optical switch 43B serving as the command reply switch terminates the second reply signal from the coupler 42B when an optical signal is inputted through the second terminal station 2-2 side down-direction line 5b, and supplies the second reply signal through the coupler 44B and the first terminal station 2-1 side down-direction line 5b to the first terminal station 2-1 when an optical signal is not inputted through the second terminal station 2-2 side down-direction line 5b.

Moreover, the optical switch 45B terminates the second reply signal from the coupler 44B when an optical signal is inputted through the first terminal station 2-1 side up-direction line 5a, and supplies the second reply signal through the second terminal station 2-2 side up-direction line 5a to the first terminal station 2-1 when an optical signal is not inputted through the first terminal station 2-1 side up-direction line 5a.

In other words, in a case in which an optical signal is not inputted through the second terminal station 2-2 side down-direction line 5b, the first reply signal addressed to the second terminal station, which has been made by the branching in the coupler 42B, is returned as the second reply signal, addressed to the first terminal station, through the optical switch 43B and the coupler 44B to the optical fiber 3a.

Likewise, in a case in which an optical signal is not inputted through the first terminal station 2-1 side up-direction line 5a, the first reply signal addressed to the first terminal station, which has been made by the branching in the coupler 44B, is returned as the second reply signal, addressed to the second terminal station, through the optical switch 45B and the coupler 42B to the optical fiber 3b.

Even in a case in which the Raman amplification repeater 4B having this configuration is used as Raman amplification repeaters 4B-1 to 4B-n in place of the Raman amplification repeaters 4-1 to 4-n shown in FIG. 1, the monitor control is also executable as in the case of the above-described first embodiment. That is, the first and second terminal stations 2-1 and 2-2 can monitor the states of the Raman amplification repeaters 4B-1 to 4B-n through the interchange of monitor control information with the Raman amplification repeaters 4B-1 to 4B-*n* and, if a trouble occurs, can quickly specify the trouble occurrence site.

In this case, in each of the Raman amplification repeaters 4B-1 to 4B-*n*, when an optical signal to be repeated is inputted through each of the up-direction and down-direction lines 5*a* and 5*b*, by means of the switching action of the optical switches 43B and 45B, with respect to a monitor control signal from the first terminal station 2-1 or the second terminal station 2-2, the reply is made through the use of a first reply signal obtained by superimposing an answer signal on the Raman-amplified main signal.

Moreover, in a case in which a break/disconnection trouble or the like occurs in an optical fiber in the vicinity of each of the Raman amplification repeaters 4B-1 to 4B-*n* and an optical signal to be repeated is not inputted thereto through each of the up-direction and down-direction lines 5*a* and 5*b*, with respect to a monitor control command from the first terminal station 2-1 or the second terminal station 2-2, through the use of the couplers 42B, 44B and the optical switches 43B, 45B, the reply is made using the second reply signal obtained by turning back the first reply signal addressed thereto.

That is, since the answer signals to be superimposed on the main signals propagating in the optical fibers 3*a* and 3*b* of the two-way lines 5*a* and 5*b* are the same, as the reply to the monitor control command, the first reply signal addressed thereto can be used as an answer signal at the occurrence of an optical input disconnection.

Thus, also in the third embodiment of the present invention, in the case of the occurrence of a break/disconnection trouble in an optical fiber cable in conducting the optical amplification repeating through the Raman amplification, the high-quality monitor control is achievable.

[D] Description of Fourth Embodiment

Figure 7:
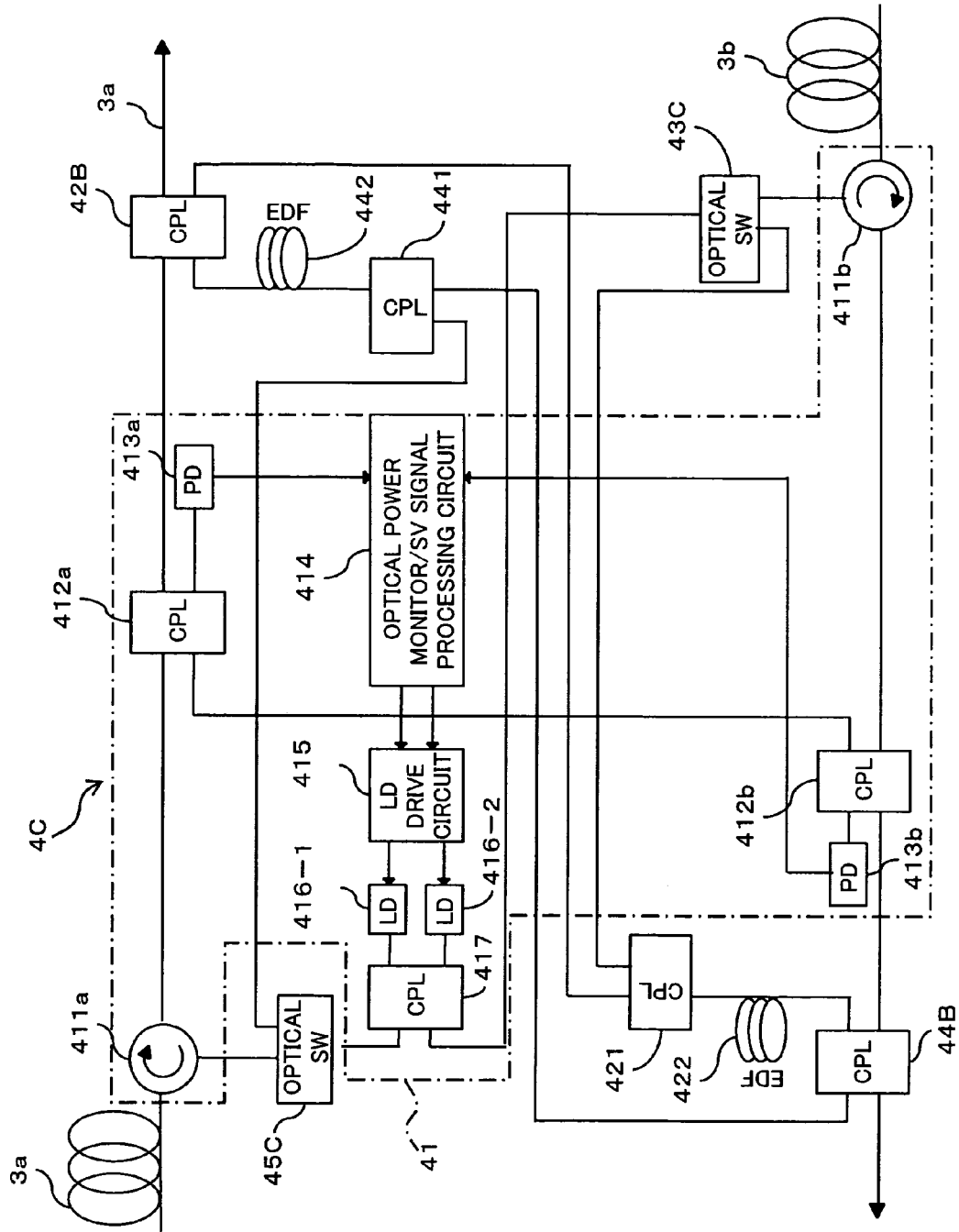
FIG. 7 is a block diagram showing a Raman amplification repeater according to a fourth embodiment of the present invention.

FIG. 7 is a block diagram showing a Raman amplification repeater 4C according to a fourth embodiment of the present invention. The Raman amplification repeater 4C shown in FIG. 7 is also applicable to each of the Raman amplification repeaters 4-1 to 4-*n* of the above-described Raman amplification repeating system 1 according to the first embodiment.

In the Raman amplification repeater 4C shown in FIG. 7, in comparison with the Raman amplification repeater 4B according to the third embodiment, in addition to the coupler 42B, a coupler 421 and an EDF 422 have a function of the answer signal production unit, and optical switches 43C and 45C are different functions. In FIG. 7, the same reference numerals as those in FIG. 6 represent the corresponding parts.

The Raman amplification repeater 4C shown in FIG. 7 has an additional function to amplify an optical signal (optical signal obtained by branching the first reply signal) in a case in which a line loss is large when the optical signal returned by the coupler 42B in the Raman amplification repeater 4B is supplied through the optical signal 43B to the coupler 44B. Moreover, it has an additional function to, when an optical signal returned by the coupler 44B is supplied to the coupler 42B, amplify this optical signal.

That is, in the Raman amplification repeater 4C, the coupler 441 and the EDF 442 are provided to, when the optical signal returned by the coupler 42B is supplied to the coupler 44B, amplify the optical signal. In addition, the coupler 421 and the EDF 422, when an optical signal returned by the coupler 44B is supplied to the coupler 42B, amplify the optical signal.

The EDF 422 functions as a doped fiber to amplify an optical signal, extracted by the coupler 42B, with a down-direction line Raman excitation light from the Raman excitation light production/answer signal superimposition unit 41 for outputting it as a second reply signal. The coupler 42B serving as an optical signal extraction coupler and the EDF 422 serving as a doped fiber organize an answer signal production unit.

Moreover, the optical switch 43C receives optical input disconnection detection information from the optical power monitor/SV signal processing circuit 414 switches the destination of the Raman excitation light from the Raman excitation light production/answer signal superimposition unit 41 in accordance with whether or not an optical signal is inputted through the second terminal station 2-2 side down-direction line 5*b*. Likewise, the optical switch 45C receives optical input disconnection detection information from the optical power monitor/SV signal processing circuit 414 switches the destination of the Raman excitation light from the Raman excitation light production/answer signal superimposition unit 41 in accordance with whether or not an optical signal is inputted through the first terminal station 2-1 side up-direction line 5*a*.

Concretely, the optical switch 43C acting as a command reply switch outputs, as a latter excitation light, the Raman excitation light from the coupler 417 through the circulator 411*b* to the optical fiber 3*b* when an optical signal is inputted through the second terminal station 2-2 side down-direction line 5*b*, while outputting it as an excitation light by the EDF 422 through the coupler 421 when an optical signal is not inputted through the second terminal station 2-2 side down-direction line 5*b*.

Moreover, the optical switch 45C outputs, as a latter excitation light, the Raman excitation light from the coupler 417 through the circulator 411*a* to the optical fiber 3*a* when an optical signal is inputted through the first terminal station 2-1 side down-direction line 5*a*, while outputting the Raman excitation light from the coupler 417, as an excitation light from the EDF 442, through the coupler 441 when an optical signal is not inputted through the first terminal station 2-1 side up-direction line 5*a*.

Even in a case in which the Raman amplification repeater 4C having this configuration is used as Raman amplification repeaters 4C-1 to 4C-*n* in place of the Raman amplification repeaters 4-1 to 4-*n* shown in FIG. 1, the monitor control is also executable as in the case of the above-described first embodiment. That is, the first and second terminal stations 2-1 and 2-2 can monitor the states of the Raman amplification repeaters 4C-1 to 4C-n through the interchange of monitor control information with the Raman amplification repeaters 4C-1 to 4C-n and, if a trouble occurs, can quickly specify the trouble occurrence site.

In this case, in each of the Raman amplification repeaters 4C-1 to 4C-n, when an optical signal to be repeated is inputted through each of the up-direction and down-direction lines 5*a* and 5*b*, by means of the switching action of the optical switches 43C and 45C, with respect to a monitor control signal from the first terminal station 2-1 or the second terminal station 2-2, the reply is made through the use of a first reply signal obtained by superimposing an answer signal on the Raman-amplified main signal.

Moreover, in a case in which a break/disconnection trouble or the like occurs in an optical fiber in the vicinity of each of the Raman amplification repeaters 4C-1 to 4C-n and an optical signal to be repeated is not inputted thereto through each of the up-direction and down-direction lines 5*a* and 5*b*, through the use of the couplers 42B, 44B and the optical switches 43C, 45C, with respect to a monitor control command from the first terminal station 2-1 or the second terminal station 2-2, the reply is made using the second reply signal obtained by turning back the first reply signal addressed thereto.

In this connection, in each of the Raman amplification repeaters 4C-1 to 4C-n, although a signal returned from the coupler 42B is outputted through the coupler 421, the EDF 422 and the coupler 44B to the down-direction line 5b also in a case in which an optical signal to be repeated is inputted through the down-direction line 5b, with respect to this returned light, the EDF 422 is not excited and, hence, the optical signal is absorbed by the EDF 422 to attenuate to an ignorable degree at the input of the coupler 44B. This also applies to the returned light in a case in which an optical signal to be repeated is inputted through the up-direction line 5a.

Thus, also in the fourth embodiment of the present invention, as with the above-described third embodiment, in a case in which a break/disconnection trouble occurs in an optical fiber cable in conducting the optical amplification repeating through the Raman amplification, the high-quality monitor control is achievable.

[E] Description of Fifth Embodiment

Figure 8:
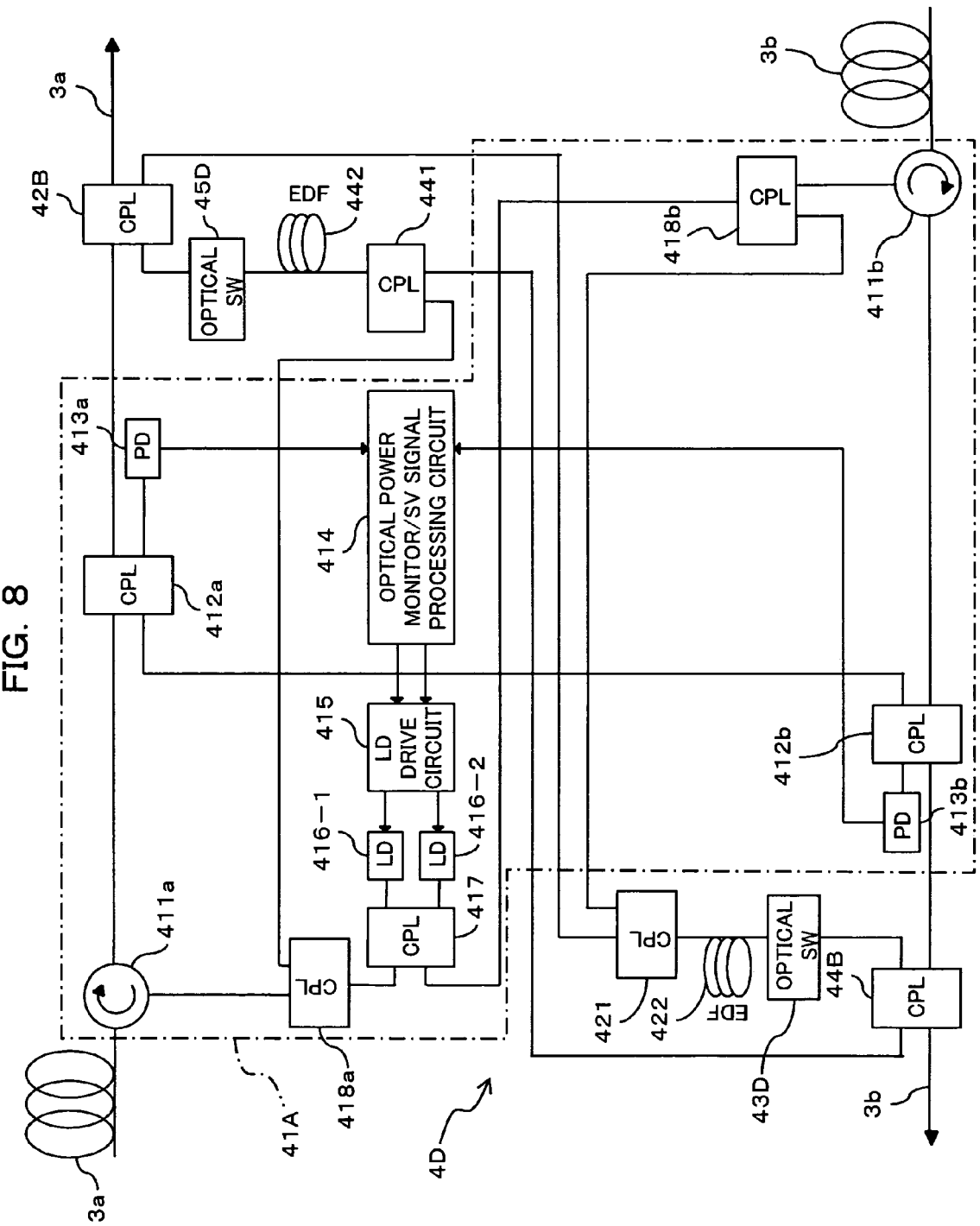
FIG. 8 is a block diagram showing a Raman amplification repeater according to a fifth embodiment of the present invention.

FIG. 8 is a block diagram showing a Raman amplification repeater 4D according to a fifth embodiment of the present invention. The Raman amplification repeater 4D shown in FIG. 8 is also applicable to each of the Raman amplification repeaters 4-1 to 4-n of the above-described Raman amplification repeating system 1 according to the first embodiment.

In comparison with the Raman amplification repeater 4C according to the fourth embodiment, the Raman amplification repeater 4D shown in FIG. 8 is the same in that, in addition to the coupler 42B, the coupler 421 and the EDF 422 have a function of the answer signal production unit, but differs therefrom in the configuration of the Raman excitation light production/answer signal superimposition unit 41A, and optical switches 43D and 45D are used which are different in function therefrom. In FIG. 8, the same reference numerals as those in FIG. 7 depict the corresponding parts.

The Raman excitation light production/answer signal superimposition unit 41A shown in FIG. 8 has a configuration similar to the above-described configuration shown in FIG. 5. That is, in comparison with the above-described configuration (see reference numeral 41) shown in FIG. 7, couplers 418a and 418b are provided at the positions of the optical switches 45C and 43C, respectively.

Moreover, an optical switch 43D receives optical input disconnection detection information from the optical power monitor/SV signal processing circuit 414 to make the switching between conduction and disconnection of an (answer signal modulated) optical signal from the EDF 422 in accordance with whether or not an optical signal is inputted through the second terminal station 2-2 side down-direction line 5b. Likewise, the optical switch 45D receives the optical input disconnection detection information from the optical power monitor/SV signal processing circuit 414 to make the switching between conduction and disconnection of the (answer signal modulated) optical signal from the EDF 422 in accordance with whether or not an optical signal is inputted through the first terminal station 2-1 side down-direction line 5a.

Concretely, the optical switch 43D serving as a command reply switch terminates an optical signal amplified in the EDF 422 when an optical signal is inputted through the second terminal station 2-2 side down-direction line 5b, while outputting it as a second reply signal through the coupler 44B when an optical signal is not inputted through the second terminal station 2-2 side down-direction line 5b.

Moreover, the optical switch 45D terminates an optical signal amplified in the EDF 442 when an optical signal is inputted through the first terminal station 2-1 side up-direction line 5a, while outputting the optical signal amplified in the EDF 442 as a second reply signal through the coupler 42B when an optical signal is not inputted through the first terminal station 2-1 side up-direction line 5a.

Thus, when an optical signal to be repeated is inputted through the down-direction line 5b, it is possible to eliminate the influence of the reflection of the returned light from the coupler 42B, and if the optical signal to be repeated is not inputted through the down-direction line 5b, it is possible to output a second reply signal with a sufficient optical level. This also applies to the up-direction line 5a.

Even in a case in which the Raman amplification repeater 4D having this configuration is used as Raman amplification repeaters 4D-1 to 4D-n in place of the Raman amplification repeaters 4-1 to 4-n shown in FIG. 1, the monitor control is also executable as in the case of the above-described first embodiment. That is, the first and second terminal stations 2-1 and 2-2 can monitor the states of the Raman amplification repeaters 4D-1 to 4D-n through the interchange of monitor control information with the Raman amplification repeaters 4D-1 to 4D-n and, if a trouble occurs, can quickly specify the trouble occurrence site.

In this case, in each of the Raman amplification repeaters 4D-1 to 4D-n, when an optical signal to be repeated is inputted through each of the up-direction and down-direction lines 5a and 5b, by means of the couplers 418b and 418a, with respect to a monitor control signal from the first terminal station 2-1 or the second terminal station 2-2, the reply is made through the use of a first reply signal obtained by superimposing an answer signal on the Raman-amplified main signal. Moreover, since the second reply signal from the EDF 422, 442 is terminated by the optical switch 43D, 45D, it is not supplied to the line 5b, 5a.

Moreover, in a case in which a break/disconnection trouble or the like occurs in an optical fiber in the vicinity of each of the Raman amplification repeaters 4D-1 to 4D-n and an optical signal to be repeated is not inputted thereto through each of the up-direction and down-direction lines 5a and 5b, through the use of the optical switches 43D and 45D, with respect to a monitor control command from the first terminal station 2-1 or the second terminal station 2-2, the reply is made using the second reply signal obtained by turning back the first reply signal addressed thereto and amplified by the EDF 422, 442.

Thus, also in the fifth embodiment of the present invention, as with the above-described third embodiment, in a case in which a break/disconnection trouble occurs in an optical fiber cable in conducting the optical amplification repeating through the Raman amplification, the high-quality monitor control is achievable.

[F] Description of Sixth Embodiment

Although in each of the above-described embodiments a reply signal (returned in the opposed line) to a monitor control signal (SV signal) is transmitted when a break/disconnection trouble occurs in an optical fiber cable, the present invention is not limited to this, but, for example, even in a case in which light (optical signal) to be superimposed is absent when an SV signal is transmitted through the Raman amplification, the SV signal can be transmitted to a downstream repeater or terminal station.

Figure 9:
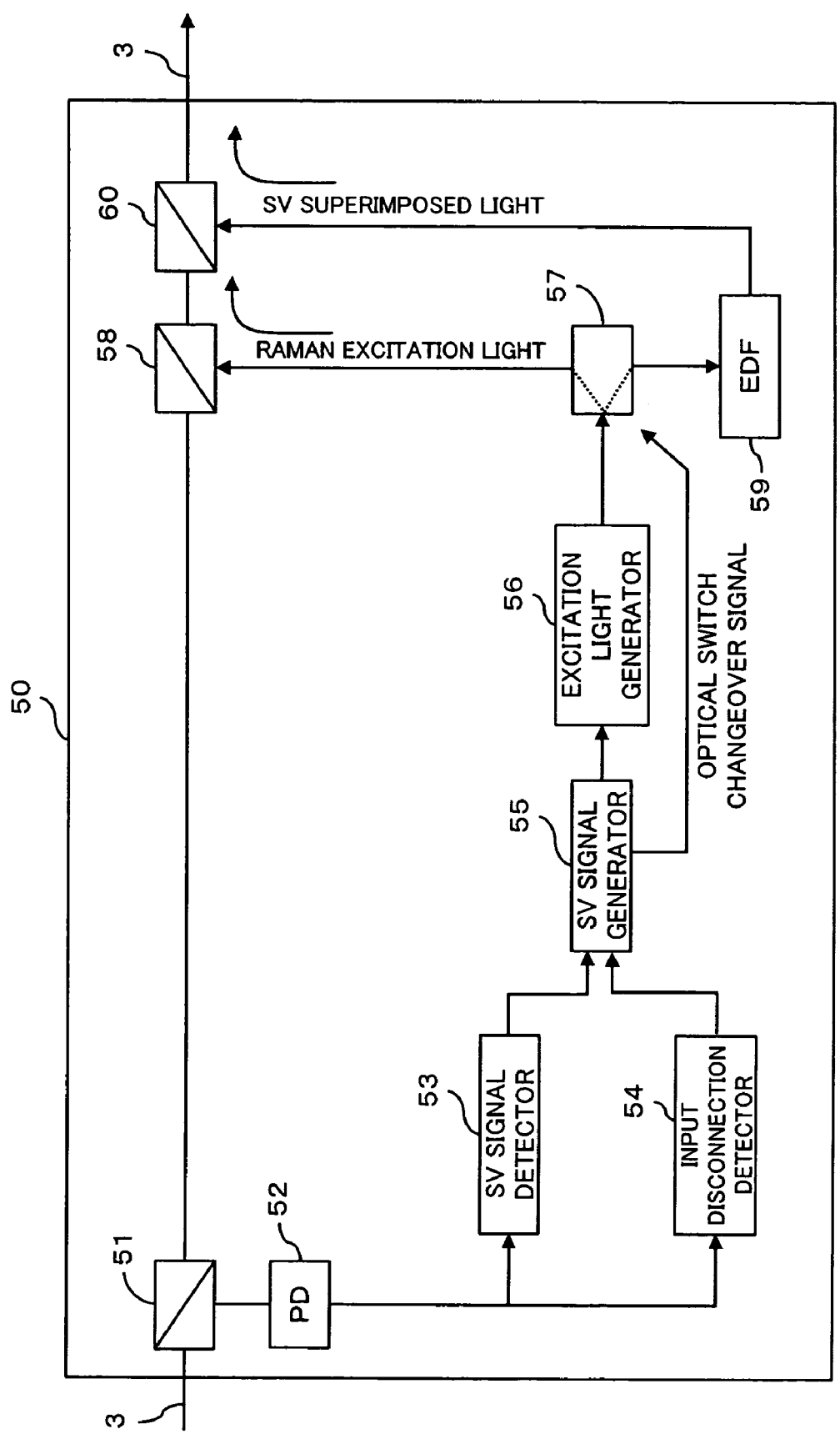
FIG. 9 is a block diagram showing a Raman amplification repeater according to a sixth embodiment of the present invention.

A repeater in this case can have, for example, a configuration shown in FIG. 9.

FIG. 9 is a block diagram showing a Raman amplification repeater (repeater) 50 according to a sixth embodiment of the present invention. As with the repeater according to each of the above-described embodiments, in the Raman amplification repeater 50 shown in FIG. 9, a first terminal station (not shown) (see reference numeral 2-1 in FIG. 1) and a second terminal station (not shown) (see reference numeral 2-2 in FIG. 1) are connected through a transmission line fiber 3 forming an up-direction line. However, the Raman amplification repeater 50 differs from the repeater according to each of the above-described embodiments in that an optical signal propagating in the transmission line fiber 3 is Raman-amplified by the forward excitation instead of the rearward excitation.

In FIG. 9, although the illustration is made noting the transmission line fiber 3 forming the up-direction line, like connection can also be made with respect to a transmission line fiber forming a down-direction line.

The Raman amplification repeater 50 is made up of an optical coupler 51, a photodiode (PD) 52, an SV signal detector 53, an input disconnection detector 54, an SV signal generator 55, an excitation light generator 56, an optical switch 57, an optical coupler 58, an Erbium-doped fiber (EDF) 59 and an optical coupler 60.

In this configuration, the optical coupler 51 branches an optical signal for the repeating amplification inputted through the transmission line fiber 3 at a predetermined branching ratio, with one being outputted to the photodiode 52 and the other being outputted to the latter-stage optical coupler 58. The photodiode 52 is for converting a portion of the optical signal obtained by the branching in the optical coupler 51 into an electric signal.

The SV signal generator 53 is for detecting an SV signal, superimposed as a monitor signal on an optical signal to be repeated through the transmission line fiber 3, on the basis of the electric signal from the aforesaid photodiode 52, and has a function similar to the band pass filter 4141, the amplification/waveform-shaping processing circuit 4142, the decoder 4143 and the command decision unit 4145.

Moreover, the input disconnection detector 54 is made to monitor an input level of an optical signal, transmitted through the transmission line fiber 3, on the basis of the electric signal from the photodiode 52, and further to make a decision as to whether an optical signal is inputted or not, with a decision result being notified to the SV signal generator 55. In particular, the input disconnection detector 54 detects a state in which an optical signal from the transmission line fiber 3 does not propagate, and outputs it as an input disconnection detection signal to the SV signal generator 55.

The SV signal generator 55 receives the SV signal detected by the SV signal detector 53 and the input disconnection detection signal from the input disconnection detector 54 and, if an optical signal does not propagate through the transmission line fiber 3, produces an SV signal for repeating and transmitting the SV signal detected by the SV signal detector 53 to the latter-stage repeater or terminal station.

Concretely, in the SV signal generator 55, in a case in which an optical signal is inputted through the transmission line fiber 3, an SV signal is produced in consideration of the SV signal detected by the SV signal detector 53, the number of optical signal repeating stages, and others, and when an optical signal passing through the transmission line fiber 3 falls into a disconnection (cutoff) state, an SV signal is produced to notify this disconnection state to the latter-stage repeater or terminal station.

The excitation light generator 56 produces an excitation light for Raman-amplifying an optical signal, to be repeated and transmitted through the transmission line fiber 3, by means of the forward excitation, and superimposes an SV signal generated from the SV signal generator 55 on the light for the aforesaid forward excitation. The excitation light generator 56 is equipped with laser diodes and an LD drive circuit for the laser diodes (see reference numerals 416-1, 416-2 and 415 in FIG. 2). That is, an SV signal superimposed excitation light can be generated by a drive current from this LD drive circuit.

The optical switch 57 is for selectively outputting an excitation light, on which the SV signal from the excitation light generator 56 is superimposed, on the basis of the optical input disconnection detection information from the SV signal generator 55.

Concretely, on the basis of the optical input disconnection detection information from the SV signal generator 55, the optical switch 57 outputs the SV signal superimposed excitation light from the excitation light generator 56 as a forward Raman-excitation light to the optical coupler 58 when an optical signal is inputted through the transmission line fiber 3 while outputting the SV signal superimposed light from the excitation light generator 56 to the EDF 59 when the optical signal passing through the transmission line fiber 3 falls into a disconnection state.

That is, when the optical signal passing through the transmission line fiber 3 falls into a disconnection state, the light from the excitation light generator 56 is inputted to the EDF 59 as a light for the generation of an ASE light instead of the Raman excitation light. At this time, the SV signal superimposed in the excitation light generator 56 includes the information to the effect that the optical signal passing through the transmission line fiber 3 is in a disconnection state.

Moreover, the optical coupler 58 supplies the forward Raman-excitation light through the optical switch 57 to an optical signal from the transmission line fiber 3 to carry out the repeat amplification on the optical signal.

Accordingly, the excitation light generator 56 and the optical coupler 58 function as a (first) means to modulate the excitation light for the amplification of an optical signal (transmitted through the transmission line fiber 3) with a signal (SV signal) and supply this optical signal to the transmission line in a state where an SV signal is superimposed thereon.

Still moreover, the EDF 59 receives, from the optical switch 57, the light including (superimposed) an SV signal to the effect that the optical signal passing through the transmission line fiber 3 falls into a disconnection state, and generates an ASE light on which this SV signal is superimposed. The optical coupler 60 supplies the ASE light from the EDF 59 as an SV superimposed light to the transmission line fiber 3, thereby transmitting the ASE light, i.e., an SV signal, to the latter-stage repeater or terminal station.

Therefore, the EDF 59 and the optical coupler 60 function as a second means to generate a signal (SV signal) superimposed light and supply it to the transmission line (transmission line fiber 3), and the optical switch 57 functions as a means to supply the excitation light, modulated with a signal from the excitation light generator 56 acting as the first means, to the transmission line when an optical signal propagates and to supply the light, on which the signal from the EDF 59 functioning as the second means is superimposed, to the transmission line when the optical signal does not propagate.

According to the sixth embodiment of the present invention, with the above-described configuration, an optical signal propagating on the transmission line fiber 3 is repeated and transmitted in a state Raman-amplified in the Raman amplification repeater 50.

At this time, in the Raman amplification repeater 50, the optical switch 57 supplies the SV signal superimposed light from the excitation light generator 56 as the forward Raman-excitation light through the optical coupler 58 to the transmission line fiber 3 when an optical signal propagates on the transmission line fiber 3, and supplies an ASE light, on which an SV signal from the EDF 59 is superimposed, through the optical coupler 60 to the transmission line fiber 3 when an optical signal does not propagate on the transmission line fiber 3.

That is, in the Raman amplification repeater 50, even if an optical signal does not propagate on the transmission line fiber 3, an SV signal can be transmitted to the latter-stage repeater or terminal station.

As described above, in the case of the Raman amplification repeater 50 according to the sixth embodiment of the present invention, even if an optical signal does not propagate on the transmission line fiber 3 because a fiber disconnection or the like occurs in the former-state repeating zone in conducting the optical amplification repeating through the Raman amplification, the high-quality monitor control is achievable, and the Erbium-doped fibers 42 and 44 do not require a high-accuracy characteristic, which contributes to the cost reduction of the system construction.

[G] Others

Although in the above-described first, second, fourth and fifth embodiments the EDFs 42, 44, 422 and 442, which are Erbium doped fibers, are put to use, according to the present invention, it is also possible to use doped fibers in which rare earth elements or the like other than Erbium are doped.

It should be understood that the present invention is not limited to the above-described embodiments, and that it is intended to cover all changes and modifications of the embodiments of the invention herein which do not constitute departures from the spirit and scope of the invention.

What is claimed is:

1. A repeater for conducting Raman amplification on an optical signal propagating in a transmission line, comprising:
    a Raman excitation light production/answer signal superimposition unit for modulating an answer signal to a monitor control command, included in an optical signal from a first terminal station through an up-direction line, into a Raman excitation light for the Raman amplification and for supplying the modulated Raman excitation light to a transmission line fiber of a down-direction line on a second terminal station side to produce a first reply signal for said down-direction line by superimposing said answer signal on an optical signal passing through said down-direction line on said second terminal station side; and
    an answer signal production unit for producing a second reply signal to said monitor control command in a case in which an optical signal is not inputted through said second terminal station side down-direction line.

2. The repeater according to claim 1, further comprising a command reply switch for selectively using said first reply signal as a reply signal passing through a down-direction line on said first terminal station side with respect to said monitor control command when an optical signal passing through said second terminal station side down-direction line is inputted, and said second reply signal as said reply signal when said optical signal is not inputted through said second terminal station side down-direction line, with said command reply switch supplying said down-direction line Raman excitation light to said down-direction line transmission line fiber on said second terminal station side when said optical signal is inputted through said second terminal station side down-direction line and supplying said down-direction line Raman excitation light to said answer signal production unit when said optical signal is not inputted through said second terminal station side down-direction line, and said answer signal production unit including a doped fiber made to output an amplified spontaneous emission light as said second reply signal in response to said down-direction line Raman excitation light from said command reply switch, with said amplified spontaneous emission light outputted from said doped fiber being transmitted through said first terminal station side down-direction line to said first terminal station.

3. The repeater according to claim 1, wherein said Raman excitation light production/answer signal superimposition unit supplying said down-direction line Raman excitation light to said down-direction line transmission line fiber on said second terminal station side and further to said answer signal production unit,
    said answer signal production unit including a doped fiber for outputting an amplified spontaneous emission light as said second reply signal in response to said down-direction line Raman excitation light from said Raman excitation light production/answer signal superimposition unit, and the repeater further comprising:
    a command reply switch for selectively using said first reply signal as a reply signal passing through a down-direction line on said first terminal station side with respect to said monitor control command when an optical signal passing through said second terminal station side down-direction line is inputted, and said second reply signal as said reply signal when said optical signal is not inputted through said second terminal station side down-direction line, with said command reply switch terminating said amplified spontaneous emission light from said doped fiber when said optical signal is inputted through said second terminal station side down-direction line, and transmitting said amplified spontaneous emission light through said first terminal station down-direction line to said first terminal station when said optical signal is not inputted through said second terminal station side down-direction line.

4. The repeater according to claim 1, wherein said Raman excitation light production/answer signal superimposition unit supplying the modulated Raman excitation light to a transmission line fiber of said up-direction line to further superimpose said answer signal on said optical signal passing through said up-direction line from said first terminal station for producing said first reply signal for said up-direction line,
    said answer signal production unit including an optical signal extraction coupler for extracting a portion of a signal corresponding to said first reply signal from said up-direction line as said second reply signal, and the repeater further comprising:
    a command reply switch for selectively using said first reply signal as a reply signal passing through a down-direction line on said first terminal station side with respect to said monitor control command when an optical signal passing through said second terminal station side down-direction line is inputted, and said second reply signal as said reply signal when said optical signal is not inputted through said second terminal station side down-direction line, with said command reply switch terminating said second reply signal extracted by said optical signal extraction coupler when said optical signal is inputted through said second terminal station side down-direction line, and returning said second reply signal through said first terminal station down-direction line to said first terminal station when said optical signal is not inputted through said second terminal station side down-direction line.

5. The repeater according to claim 1, wherein said Raman excitation light production/answer signal superimposition unit further superimposing said answer signal on an optical signal passing through said up-direction line from said first terminal station by supplying an up-direction line Raman excitation light to a transmission line fiber of said up-direction line to produce a signal corresponding to said first reply signal, said answer signal production unit including an optical signal extraction coupler for extracting a portion of an optical signal from said up-direction line, on which said signal corresponding to said first reply signal is superimposed, and a doped fiber for amplifying said optical signal, extracted by said optical signal extraction coupler, by said down-direction line Raman excitation light to output it as said second reply signal, and the repeater further comprising:

a command reply switch is provided to selectively use said first reply signal when an optical signal passing through said second terminal station side down-direction line is inputted as an answer signal passing through a down-direction line on said first terminal station side with respect to said monitor control command and said second reply signal when said optical signal is not inputted through said second terminal station side down-direction line, with said command reply switch supplying said down-direction line Raman excitation light to said down-direction line transmission line fiber when said optical signal is inputted through said second terminal station side down-direction line, and supplying said down-direction line Raman excitation light to said doped fiber when said optical signal is not inputted through said second terminal station side down-direction line, and said second reply signal amplified by said doped fiber being returned through said first terminal station side down-direction line to said first terminal station.

6. The repeater according to claim 1, wherein said Raman excitation light production/answer signal superimposition unit further superimposing said answer signal on an optical signal passing through said up-direction line from said first terminal station by supplying an up-direction line Raman excitation light to a transmission line fiber of said up-direction line to produce a signal corresponding to said first reply signal, and supplying said down-direction line Raman excitation light to said down-direction transmission line fiber and further to said answer signal production unit, said answer signal production unit including an optical signal extraction coupler for extracting a portion of an optical signal from said up-direction line, on which said signal corresponding to said first reply signal is superimposed, and a doped fiber for amplifying said optical signal, extracted by said optical signal extraction coupler, by said down-direction line Raman excitation light to output it as said second reply signal, and the repeater further comprising:

a command reply switch for selectively using said first reply signal as a reply signal passing through a down-direction line on said first terminal station side with respect to said monitor control command when an optical signal passing through said second terminal station side down-direction line is inputted, and said second reply signal as said reply signal when said optical signal is not inputted through said second terminal station side down-direction line, with said command reply switch terminating said second reply signal amplified by said doped fiber when said optical signal is inputted through said second terminal station side down-direction line and supplying said second reply signal through said first terminal station side down-direction line to said first terminal station when said optical signal is not inputted through said second terminal station side down-direction line.

7. The repeater according to claim 2, wherein said doped fiber is a rare earth doped fiber.

8. The repeater according to claim 3, wherein said doped fiber is a rare earth doped fiber.

9. The repeater according to claim 5, wherein said doped fiber is a rare earth doped fiber.

10. The repeater according to claim 6, wherein said doped fiber is a rare earth doped fiber.

11. The repeater according to claim 1, wherein said Raman excitation light production/answer signal superimposition unit supplying said command reply switch with information on whether or not said optical signal is inputted through said second terminal station side down-direction line on the basis of power of an optical signal passing through said second terminal station side down-direction line.

12. A repeater for repeating an optical signal from an incoming transmission line to an outgoing transmission line and for conducting Raman amplification on an optical signal propagating through said outgoing transmission line, comprising:

first means for modulating an excitation light for the amplification of said optical signal with a signal to superimpose said signal on said optical signal;

second means for generating an amplified spontaneous emission light from said excitation light modulated by said first means; and third means for supplying said excitation light modulated by said first means to said outgoing transmission line when said optical signal propagates through the incoming transmission line and for supplying said amplified spontaneous emission light generated by said second means to said outgoing transmission line when said optical signal does not propagate through said incoming transmission line.

13. A Raman amplification repeating system designed such that first and second terminal stations are connected through a transmission line fiber and an optical signal propagating in said transmission line fiber is Raman-amplified through the use of one or plural Raman amplifier repeaters for repeating, each of said first and second terminal stations comprising:

a monitor control command transmission unit for transmitting a monitor control command, addressed to one of said one or plural Raman amplification repeaters, together with identification information on said Raman amplification repeater; and a monitor control implementation unit for receiving an answer to said monitor control command from the one or plural Raman amplification repeaters to implement monitor control, and said one or plural Raman amplifier repeaters including:

a Raman excitation light production/answer signal superimposition unit for modulating an answer signal to a monitor control command included in an optical signal from said monitor control command transmission unit of one of said first and second terminal stations into a Raman excitation light for the Raman amplification to supply the modulated Raman excitation light to transmission line fibers of two-way lines on said first and second terminal station sides so that said answer signal is superimposed on an optical signal passing through said two-way lines to produce a first reply signal;

a first terminal station addressed answer signal production unit for producing a second reply signal, addressed to said first terminal station, with respect to said monitor control command when an optical signal passing through a down-direction line on the second terminal station side is not inputted thereto;

a first terminal station addressed command reply switch for selectively using, as a first terminal station addressed reply signal passing through said first terminal station side down-direction line with respect to said monitor control command, said first reply signal when an optical signal is inputted through said second terminal station side down-direction line and said second reply signal when an optical signal is not inputted through said second terminal station side down-direction line;

a second terminal station addressed reply signal production unit for producing a third reply signal, addressed to said second terminal station, with respect to said monitor control command when an optical signal is not inputted through an up-direction line on the first terminal station side; and a second terminal station addressed command reply switch for selectively using, as a second terminal station addressed answer signal passing through an up-direction line on the second terminal station side with respect to said monitor control command, said first relay signal when an optical signal is inputted through said first terminal station side up-direction line and said third relay signal when said optical signal is not inputted through said first terminal station side up-direction line.

14. A repeater for repeating an optical signal from an incoming transmission line to an outgoing transmission line and for conducting Raman amplification on an optical signal propagating through said outgoing transmission line, comprising:

a modulator modulating an excitation light for the amplification of said optical signal with a signal to superimpose said signal on said optical signal;

an amplified spontaneous emission light generator generating an amplified spontaneous emission light from said excitation light modulated by said modulator; and a switch supplying said excitation light modulated by said modulator to said outgoing transmission line when said optical signal propagates through the incoming transmission line and supplying said amplified spontaneous emission light generated by said generator to said outgoing transmission line when said optical signal does not propagate through said incoming transmission line.

\* \* \* \* \*